United States Patent
Oka

(10) Patent No.: US 10,557,370 B2
(45) Date of Patent: Feb. 11, 2020

(54) VALVE SYSTEM AND STEAM TURBINE

(71) Applicant: MITSUBISHI HEAVY INDUSTRIES COMPRESSOR CORPORATION, Tokyo (JP)

(72) Inventor: Hiroaki Oka, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 69 days.

(21) Appl. No.: 16/065,650

(22) PCT Filed: Feb. 26, 2016

(86) PCT No.: PCT/JP2016/055787
§ 371 (c)(1),
(2) Date: Jun. 22, 2018

(87) PCT Pub. No.: WO2017/145353
PCT Pub. Date: Aug. 31, 2017

(65) Prior Publication Data
US 2018/0371935 A1 Dec. 27, 2018

(51) Int. Cl.
*F01D 17/14* (2006.01)
*F16K 31/122* (2006.01)

(52) U.S. Cl.
CPC ........ *F01D 17/145* (2013.01); *F16K 31/1221* (2013.01); *F05D 2220/31* (2013.01); *F05D 2260/57* (2013.01); *F05D 2260/606* (2013.01)

(58) Field of Classification Search
None
See application file for complete search history.

(56) References Cited

U.S. PATENT DOCUMENTS 4,470,576 A * 9/1984 Schertler ................. F16K 51/02
251/158
4,637,587 A 1/1987 Kuhnlein
(Continued)

FOREIGN PATENT DOCUMENTS

JP     S58-105615 A    6/1983
JP     S61-059078 A    3/1986
(Continued)

OTHER PUBLICATIONS

International Search Report issued in corresponding International Application No. PCT/JP2016/055787 dated May 31, 2016 (4 pages).
(Continued)

*Primary Examiner* — Michael Lebentritt
(74) *Attorney, Agent, or Firm* — Osha Liang LLP

(57) ABSTRACT

A valve system includes: a valve device with a flow path and a valve body that opens and closes the flow path; and a drive mechanism that drives the valve body. The drive mechanism includes: a cylinder case; a cylinder chamber that extends in an axis direction and is formed inside the cylinder case; a piston that divides the cylinder chamber into a first chamber on a first side in the axis direction and a second chamber on a second side in the axis direction; an inflow port through which working fluid flows to the inside of the first chamber; an elastic member disposed inside the second chamber and that pushes the piston to the first side; a bypass passage that connects the first chamber and the second chamber; and an on-off valve that opens and closes the bypass passage.

4 Claims, 4 Drawing Sheets

(56) References Cited

U.S. PATENT DOCUMENTS

| | | | | |
|---|---|---|---|---|
| 5,524,871 | A * | 6/1996 | Muller | F16F 9/43 |
| | | | | 141/37 |
| 6,389,950 | B1 * | 5/2002 | Kuhn | B66C 13/04 |
| | | | | 254/360 |
| 2008/0141921 | A1 * | 6/2008 | Hinderks | B63B 1/28 |
| | | | | 114/274 |
| 2011/0044828 | A1 * | 2/2011 | Lund | F04B 9/06 |
| | | | | 417/362 |
| 2011/0137504 | A1 * | 6/2011 | Nakamura | F01L 1/3442 |
| | | | | 701/22 |
| 2012/0227389 | A1 * | 9/2012 | Hinderks | F01B 1/10 |
| | | | | 60/317 |
| 2015/0035913 | A1 * | 2/2015 | Tsuji | B41J 2/17596 |
| | | | | 347/85 |
| 2015/0118083 | A1 * | 4/2015 | Bagagli | F04B 39/10 |
| | | | | 417/509 |
| 2018/0202980 | A1 * | 7/2018 | Leveille | G01N 30/32 |
| 2019/0153936 | A1 * | 5/2019 | Johnson | F01L 9/021 |
| 2019/0277292 | A1 * | 9/2019 | Inada | F04C 29/12 |

FOREIGN PATENT DOCUMENTS

| | | |
|---|---|---|
| JP | H05-047301 U | 6/1993 |
| JP | H08-144711 A | 6/1996 |
| JP | H09-256810 A | 9/1997 |
| JP | 2008-138716 A | 6/2008 |

OTHER PUBLICATIONS

Written Opinion issued in corresponding International Application No. PCT/JP2016/055787 dated May 31, 2016 (10 pages).

* cited by examiner

VALVE SYSTEM AND STEAM TURBINE

TECHNICAL FIELD

The present invention relates to a valve system and a steam turbine.

BACKGROUND

A steam turbine is used to drive a machine or the like and includes a turbine body having a rotor which is rotatably supported. Steam is supplied to the turbine body, and thus, the rotor is rotated.

In the steam turbine, when an operation thereof is stopped, problems such as the rotor being bent due to unbalanced heat or being deflected by its own weight may occur. Accordingly, in the steam turbine, a turning device which rotates the rotor at a low speed when the operation of the steam turbine is stopped is used (for example, refer to Patent Document 1).

Meanwhile, there is a steam turbine having an extraction line which extracts steam inside a turbine body from an intermediate stage. In the steam turbine, the extracted steam is supplied to a preceding stage or supplied to other facilities. However, since the steam turbine is stopped and a pressure inside the turbine body decreases, the extracted steam may flow back to the inside of the turbine body. Therefore, in the extraction line, a valve device for preventing a backflow of the extracted steam is provided.

In the valve device, the valve body can be opened and closed by being driven by an oil cylinder which moves a piston by control oil. In a case where the steam turbine is continuously operated over a long period of time, the valve device remains open to continue the extraction of the steam. As a result, since the position of the valve body does not move, the position of the piston which is configured to drive the valve body is not changed, there is a possibility that the piston may become stuck inside the oil cylinder and may become immovable.

CITATION LIST

[Patent Document 1] Japanese Unexamined Patent Application, First Publication No. H9-256810

Meanwhile, in order to operate the steam turbine steadily, even if the frequency of use of the steam turbine is low, it is necessary to reliably drive the valve body and close the valve device when the steam turbine is stopped. Therefore, there is a desire to periodically perform an operation test for confirming that the piston is movable while keeping the operation of the steam turbine in a state where the valve device is open.

Embodiments of the present invention provide a valve system and a steam turbine capable of performing an operation test in a state where the valve device is open.

SUMMARY

According to one or more embodiments of the present invention, there is provided a valve system, including: a valve device which has a flow path which is capable of opening and closing by a valve body; a drive mechanism which is configured to drive the valve body, in which the drive mechanism includes a cylinder case which has a cylinder chamber which extends in an axis direction and is formed inside the cylinder case, a piston which is configured to divide the cylinder chamber into a first chamber positioned on a first side in the axis direction and a second chamber positioned on a second side in the axis direction, an inflow port through which working fluid flows to the inside of the first chamber, an elastic member which is disposed inside the second chamber and biases the piston such that the piston is pushed to the first side, a bypass passage which is configured to cause the first chamber and the second chamber to communicate with each other, and an on-off valve which is capable of opening and closing the bypass passage, in which in the valve device, the piston is moved to the first side, and the valve body is movable in a direction in which the valve device is closed, and the piston is moved to the second side, and the valve body is movable in a direction in which the valve device is opened, and the bypass passage is connected to the first chamber at a position on the second side with respect to a position of the piston in the axis direction at which the valve device is in an open state.

According to one or more embodiments of this configuration, the on-off valve is opened in a state where the working fluid is supplied from the inflow port to the first chamber, and thus, a liquid surface of the working fluid does not move to the first side from a position of the piston in the axis direction at which the valve device is open. Accordingly, the piston cannot move to the first side beyond the position of the piston in the axis direction at which the valve device is in the open state. Therefore, it is possible to move the piston without making the valve device in a close state.

In the valve system according to one or more embodiments of the present invention, the bypass passage may be connected to the first chamber at a position on the second side with respect to a position of the piston in the axis direction at which the valve device is in a fully open state.

According to one or more embodiments of this configuration, even when the piston is moved by opening the on-off valve, the piston cannot move to the first side beyond the position in the axis direction at which the valve device is in the fully open state. Accordingly, it is possible to move the piston while maintaining the valve device is fully open. Therefore, it is possible to perform an operation test while maintaining the valve device is in the fully open state.

In the valve system according to one or more embodiments of the present invention, the drive mechanism may include a discharge port through which the working fluid inside the second chamber is discharged.

According to one or more embodiments of this configuration, it is possible to discharge the working fluid flowing into the second chamber via the bypass passage by opening the on-off valve, from the discharge port. Accordingly, it is possible to suppress the working fluid from accumulating in the second chamber, and no matter how many times the on-off valve is opened, the working fluid in the first chamber can flow into the second chamber. Therefore, it is possible to repeatedly move the piston every time the on-off valve is opened, and it is possible to repeatedly perform the operation test.

In the valve system according to one or more embodiments of the present invention, the valve system may further include a check valve which is connected to the inflow port.

According to one or more embodiments of this configuration, when a pressure in the first chamber is changed by opening the on-off valve in order to perform the operation test, it is possible to prevent backflow of the working fluid in the first chamber from the inflow port. In addition, it is possible to inhibit the pressure change of the first chamber from affecting a supply source of the working fluid.

According to one or more embodiments of the present invention, a steam turbine, includes: a valve system according to one or more embodiments; and a turbine body in which steam is extracted through the flow path which is opened and closed by the valve device.

According to one or more embodiments of this configuration, when the steam turbine is stopped, the valve device can be steadily in the close state so as to prevent the extracted steam from flowing back into the turbine body. Therefore, it is possible to steadily operate the steam turbine while suppressing the occurrence of trouble when the steam turbine is stopped.

According to one or more embodiments of the present invention, it is possible to perform the operation test in a state where the valve device is open.

DETAILED DESCRIPTION

Hereinafter, embodiments of a steam turbine 100 of the present invention will be described with reference to the drawings.

Figure 1:
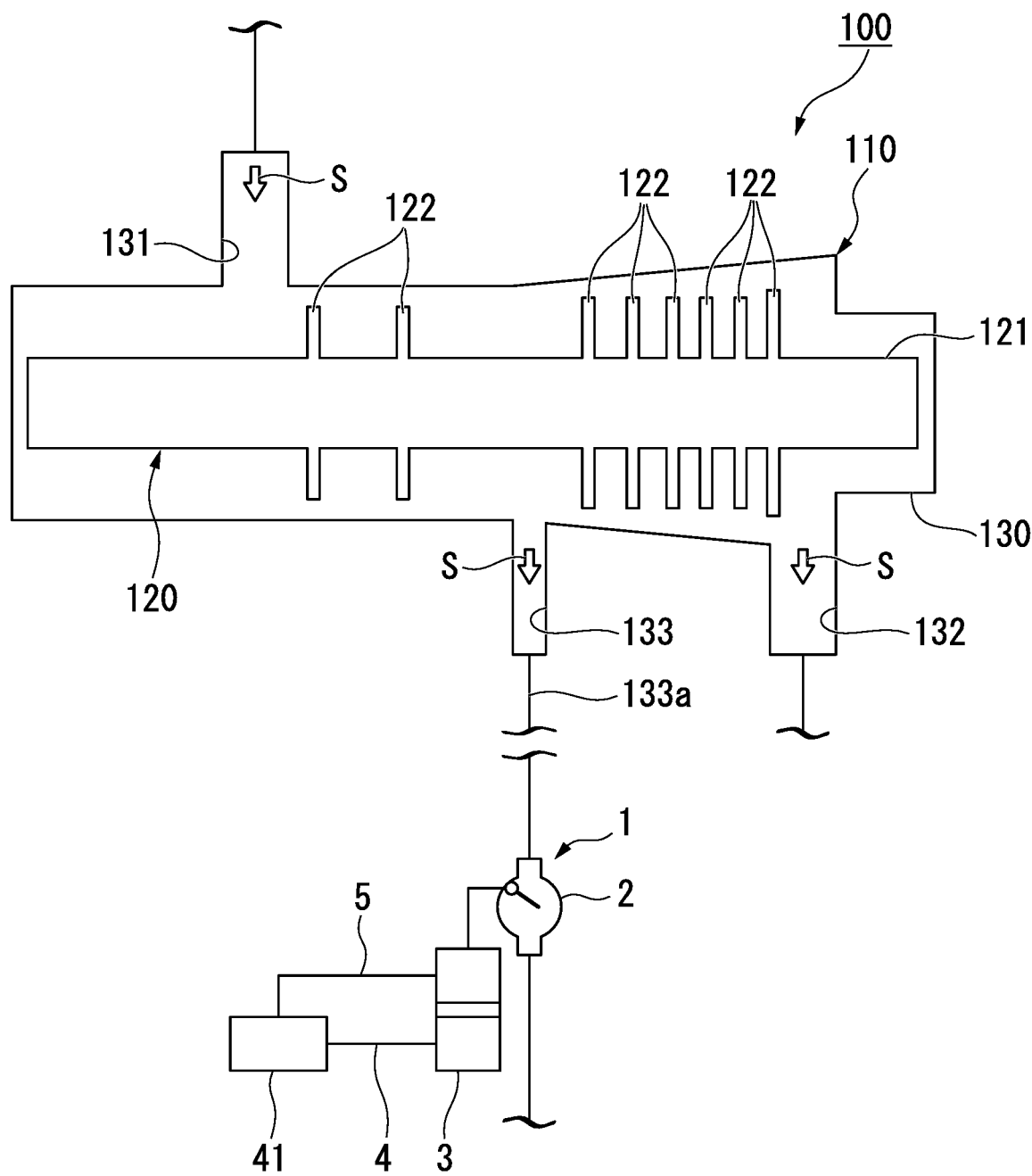
FIG. 1 is a schematic view showing a steam turbine according to one or more embodiments of the present invention.

As shown in FIG. 1, the steam turbine 100 according to one or more embodiments includes a turbine body 110 and a valve system 1.

The turbine body 110 includes a tubular casing 130 and a rotor 120 which is rotatably supported by a bearing (not shown).

The rotor 120 is disposed in the casing 130. The rotor 120 includes a rotor body 121 and a plurality of blades 122 which are fixed to the rotor body 121. Steam S is supplied to the blades 122 configured as described above, and thus, the turbine body 110 obtains a rotating force.

The casing 130 includes a steam inflow port 131, a steam discharge port 132, and an extraction port 133.

The steam S is introduced from the outside of the casing 130 into the inside thereof through the steam inflow port 131. The steam inflow port 131 is provided on an upstream side of the plurality of blades 122 of the rotor 120. Here, the upstream side indicates one side in an extension direction in which the rotor 120 extends. That is, the steam S which has flowed into the casing 130 from the steam inflow port 131 flows toward the blade 122 disposed on the most upstream side in the plurality of blades 122.

The steam S flowing into the casing 130 is discharged to the outside of the casing 130 through the steam discharge port 132. The steam discharge port 132 is disposed on a downstream side of the plurality of blades 122 of the rotor 120. Here, the downstream side indicates the other side in the extension direction in which the rotor 120 extends. That is, the steam S which has flowed through the blade 122 disposed on the most downstream side in the plurality of blades 122 is discharged through the steam discharge port 132.

The steam S inside the casing 130 is extracted to the outside from a portion between the steam inflow port 131 and the steam discharge port 132 through the extraction port 133. That is, the steam S which has a lower pressure than that of the steam S introduced from the steam inflow port 131 and a higher pressure than that of the steam S discharged from the steam discharge port 132 is extracted through the extraction port 133. The extraction port 133 is disposed between the plurality of blades 122 arranged in the extension direction of the rotor 120. That is, the steam S is extracted from an intermediate stage of the turbine body 110 through the extraction port 133. The extraction port 133 is connected to the extraction line 133a. The steam S extracted from the extraction port 133 is supplied to other steam turbines (not shown) or other facilities (not shown) through the extraction line 133a.

Figure 2:
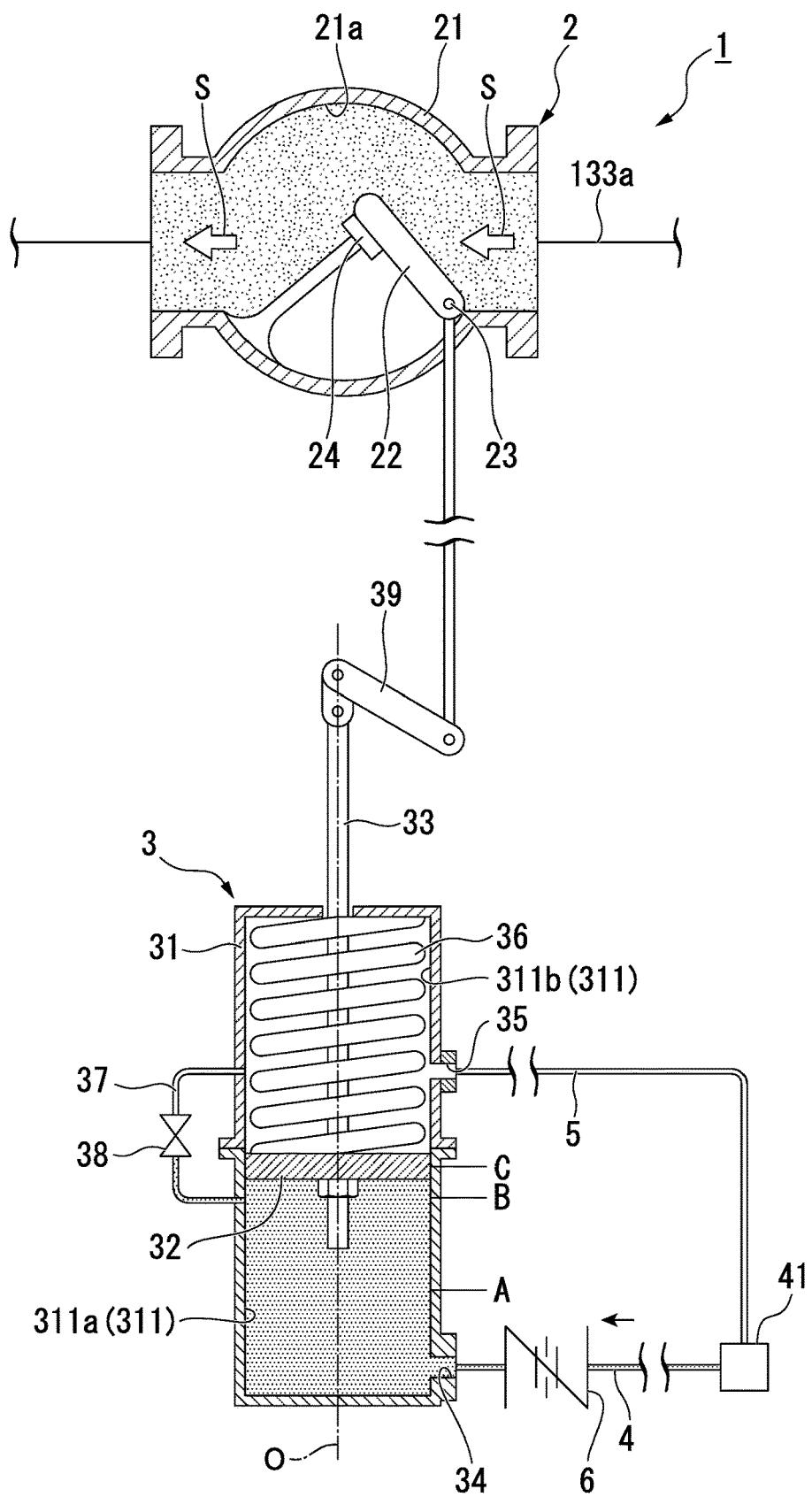
FIG. 2 is a schematic view showing a valve device when the steam turbine according to one or more embodiments of the present invention is operated.

The valve system 1 adjusts a supply amount of the steam S extracted from the extracted from the extraction port 133. As shown in FIG. 2, the valve system 1 of one or more embodiments includes a valve device 2, a drive mechanism 3, a control oil supply line 4, a control oil discharge line 5, and a check valve 6.

The valve device 2 opens and closes the extraction line 133a through which the extracted steam S flows. The valve device 2 is capable of opening and closing the flow path 21a configuring a portion of the extraction line 133a by a valve body 22. The valve device 2 is provided in an intermediate portion of the extraction line 133a. The valve device 2 of one or more embodiments is a check valve. That is, in an open state of the valve device 2, the valve device 2 causes the steam S to flow toward one direction of the flow path 21a, and in a close state thereof, the valve device 2 causes the steam S to not flow through the flow path 21a. The valve device 2 includes the valve main body 21, a valve body 22, a support shaft 23, and a restriction portion 24.

The flow path 21a through which the extracted steam S flows is provided inside the valve main body 21. The valve main body 21 is connected to the extraction line 133a. The valve main body 21 is a housing having two openings at positions opposite to each other. The flow path 21a is formed such that the two openings communicate with each other.

The valve body 22 is disposed inside the valve main body 21. The valve body 22 has a shape which can close one opening of the valve main body 21. The valve body 22 is fitted to the opening, and thus, the valve device is in the close state (a state where the steam S cannot flow through the flow path 21a). In addition, the valve body 22 is away from the opening, and thus, the valve device 2 is in the open state (a state where the steam S can flow through the flow path 21a).

The support shaft 23 rotates the valve body 22 with respect to the valve main body 21. That is, the valve body 22 rotates about the support shaft 23 with respect to the valve main body 21. The support shaft 23 is connected to the drive mechanism 3.

The restriction portion 24 restricts the position of the valve body 22. The restriction portion 24 is provided inside the valve main body 21. The restriction portion 24 is disposed at a position at which the restriction portion 24 can come into contact with the valve body 22 when the valve device 2 is in a fully open state by the valve body 22. That is, the state where the valve body 22 comes into contact with the restriction portion 24 becomes a state where the valve body 22 is the most distant from the opening of the valve main body 21. Accordingly, in the valve device 2 of one or more embodiments, the state where the valve body 22 comes into contact with the restriction portion 24 becomes the fully open state.

The drive mechanism 3 drives the valve body 22 using control oil which is a working fluid. The drive mechanism 3 adjusts an amount of the supplied control oil to adjust an opening degree of the valve device 2 and starts or stops the extraction of the steam S. The drive mechanism 3 of one or more embodiments includes a cylinder case 31, a piston 32, a rod 33, an inflow port 34, a discharge port 35, an elastic member 36, a bypass passage 37, an on-off valve 38, and a connection portion 39.

A cylinder chamber 311 extending in an axis O direction is formed inside the cylinder case 31. The cylinder chamber 311 is a space which is formed inside the cylinder case 31 and into which the control oil flows. The cylinder case 31 extends so as to form a hollow cylindrical shape about the axis O. The cylinder case 31 of one or more embodiments is formed such that opening portions of two bottomed tubular members are aligned with each other.

The piston 32 divides the cylinder chamber 311 into a first chamber 311a on a first side (one side in the axis O direction and a lower side on a paper surface in FIG. 2) in the axis O direction and a second chamber 311b on a second side (the other side in the axis O direction and an upper side the paper surface in FIG. 2) in the axis O direction. The piston 32 is disposed in the cylinder chamber 311. The piston 32 moves in the axis O direction. The entire periphery of the piston 32 can slide on an inner peripheral surface of the cylinder case 31 and a relative position of the piston 32 with respect to the cylinder case 31 is changed. The cross section of the piston 32 of one or more embodiments orthogonal to the axis O direction has a circular shape to slide on the inner peripheral surface of the cylinder case 31. Therefore, according to the movement of the piston 32, the size of the first chamber 311a and the size of the second chamber 311b are changed. The piston 32 is connected to the rod 33 described later. The piston 32 moves the cylinder chamber 311 to the first side, and thus, the valve body 22 is movable via the rod 33 such that the opening degree of the valve device 2 decreases. The piston 32 moves the cylinder chamber 311 to the second side, and thus, the valve body 22 is movable via the rod 33 such that the opening degree of the valve device 2 increases. That is, the piston 32 moves the cylinder chamber 311 to the first side, and thus, the valve body 22 is movable in a direction in which the valve device 2 is closed. The piston 32 moves the cylinder chamber 311 to the second side, and thus, the valve body 22 is movable in a direction in which the valve device 2 is opened.

The piston 32 moves toward the second side beyond a predetermined position in the axis O direction, and thus, the valve device 2 is in the open state. In this case, the position of the piston 32 in the axis O direction when the valve device 2 is in the open state is referred to as open and closed positions A. Accordingly, the piston 32 moves to a position on the second side with respect to the open and closed positions A, and thus, the valve device 2 is the open state, and the piston 32 moves to a position on the first side with respect to the open and closed positions A, and thus, the valve device 2 is in the close state. Moreover, the piston 32 can move to the second side beyond the open position. The piston 32 moves to the second side beyond the open and closed positions A, and thus, the valve device 2 is in the fully open state. In this case, the position of the piston 32 in the axis O direction when the valve device 2 is in the fully open state is referred to as a fully open position B. The piston 32 can further move to the second side beyond the fully open position B. In this case, a position of the piston 32 when the piston 32 moves to a position on the most second side in the axis O direction in the cylinder chamber 311 is referred to as a margin position C.

The rod 33 is connected to the piston 32. The rod 33 moves together with the piston 32. The rod 33 extends in the axis O direction of the cylinder case 31. The rod 33 extends to be formed in a columnar shape about the axis O of the cylinder case 31. An end portion of the rod 33 is connected to the piston 32 via a nut. An end portion of the rod 33 which is not connected to the piston 32 protrudes from an end portion of the cylinder case 31 on the second side. The rod 33 is formed to have a length at which the end portion of the rod 33 on the second side protrudes from the inside of the second chamber 311b even when the rod 33 moves to the first side in the axis O direction.

The control oil flows into the cylinder chamber 311 through the inflow port 34. The inflow port 34 is integrally formed with the cylinder case 31 to communicate with the first chamber 311a. The control oil flows into the first chamber 311a through the inflow port 34. Only one inflow port 34 is provided with respect to the cylinder case 31. Specifically, the inflow port 34 is provided on a side portion close to an end portion on the first side of the cylinder case 31. The inflow port 34 is connected to the control oil supply line 4 described later.

The control oil in the cylinder chamber 311 is discharged to the outside through the discharge port 35. The discharge port 35 is integrally provided with the cylinder case 31 to communicate with the second chamber 311b. The control oil inside the second chamber 311b is discharged to the outside through the discharge port 35. Only one discharge port 35 is provided with respect to the cylinder case 31. Specifically, the discharge port 35 is provided on the end portion at a position on the second side with respect to the margin position C of the cylinder case 31. The discharge port 35 is connected to the control oil discharge line 5 described later.

The elastic member 36 is disposed in the second chamber 311b. The elastic member 36 biases the piston 32 to push the piston 32 toward the first side in the axis O direction. The elastic member 36 is fixed to an end surface on the second side in the inner peripheral surfaces of the cylinder case 31 forming the cylinder chamber 311 and is fixed an end surface facing the second side of the piston 32. For example, a coil spring is used as the elastic member 36 of one or more embodiments.

The bypass passage 37 causes the first chamber 311a and the second chamber 311b to communicate with each other. The bypass passage 37 is a pipe which connects the first chamber 311a and the second chamber 311b to each other. The bypass passage 37 is connected to the first chamber 311a at a position on the second side with respect to the open and closed positions A. The bypass passage 37 of one or more embodiments is positioned at a position at which the opening portion is precisely closed by the piston 32 when the piston 32 is positioned at the fully open position B and is connected to the first chamber 311a at a position of the first side with respect to the margin position C. The bypass passage 37 is connected to the second chamber 311b at a position opposite to the discharge port 35.

The on-off valve 38 is provided in an intermediate portion of the bypass passage 37. The on-off valve 38 can open and close the bypass passage 37. That is, the on-off valve 38 is opened, and thus, the state of the bypass passage 37 is opened. The on-off valve 38 is closed, and thus, the state of the bypass passage 37 is closed.

The connection portion 39 connects the piston 32 and the valve body 22 to each other. The connection portion 39 rotates the valve body 22 around the support shaft 23 according to the movement of the piston 32. The connection portion 39 connects the rod 33 and the support shaft 23 to each other. When the piston 32 moves to the first side beyond the fully open position B, the rod 33 moves, and thus, the connection portion 39 rotates the support shaft 23. When the piston 32 moves to the second side beyond the fully open position B, even though the rod 33 moves, the connection portion 39 does not rotate the support shaft 23. That is, the connection portion 39 does not rotate the support shaft 23 even though the rod 33 moves between the fully open position B and the margin position C.

The control oil supply line 4 is connected to the control oil supply source 41. The control oil supply line 4 is connected to the inflow port 34. The control oil supplied from the control oil supply source 41 flows to the inflow port 34 through the control oil supply line 4. In the control oil supply line 4, the supply of the control oil from the control oil supply source 41 is stopped, and thus, the control oil discharged from the inflow port 34 flows to the control oil supply source 41 through the control oil supply line 4.

The control oil discharge line 5 is connected to the control oil supply source 41. In addition, the control oil discharge line 5 may be connected to a control oil destination which is different from the control oil supply source 41. The control oil discharge line 5 is connected to the discharge port 35. The control oil discharged from the second chamber 311b flows to the control oil supply source 41 through the control oil discharge line 5.

The check valve 6 is provided in the intermediate portion of the control oil supply line 4. The check valve 6 is connected to the inflow port 34. The check valve 6 causes the control oil to flow from the control oil supply source 41 toward the first chamber 311a. The check valve 6 controls the flow state of the control oil flowing from the first chamber 311a toward the control oil supply source 41 in order to prevent an internal pressure in the first chamber 311a from abruptly decreasing.

Next, an operation of the valve system 1 having the above-described configuration will be described.

In the above-described valve system 1, when the steam turbine 100 is operated, the valve device 2 is in the fully open state such that the steam S can be extracted from the turbine body 110 through the extraction line 133a. In order to make the valve device 2 in the fully open state, in the drive mechanism 3, the control oil is supplied to the first chamber 311a in a state where the on-off valve 38 is closed. Specifically, the control oil is supplied from the control oil supply source 41 to the inflow port 34 via the control oil supply line 4. The control oil is supplied from the inflow port 34, and thus, the control oil accumulate in the first chamber 311a, and the piston 32 is pushed by the control oil to move the second side. The piston 32 moves to the second side, and thus, the rod 33 moves, and the support shaft 23 is rotated by the connection portion 39 connected to the rod 33. The piston 32 moves to the second side beyond the open and closed positions A, and thus, the valve body 22 rotates toward the restriction portion 24. Thereafter, the piston 32 moves to the fully open position B, and the valve body 22 rotates to the position at which the valve body 22 comes into contact with the restriction portion 24. While the piston 32 moves to the margin position C beyond the fully open position B, the movement of the rod 33 is not transmitted to the support shaft 23 by the connection portion 39, and the support shaft 23 is not rotated. As a result, the valve body 22 is not rotated and valve body 22 is maintained in the position at which the valve body 22 and the restriction portion 24 come into contact with each other. Accordingly, the fully open state of the valve device 2 is maintained, and it is possible to extract the steam S in the turbine body 110 through the extraction line 133a.

Figure 3:
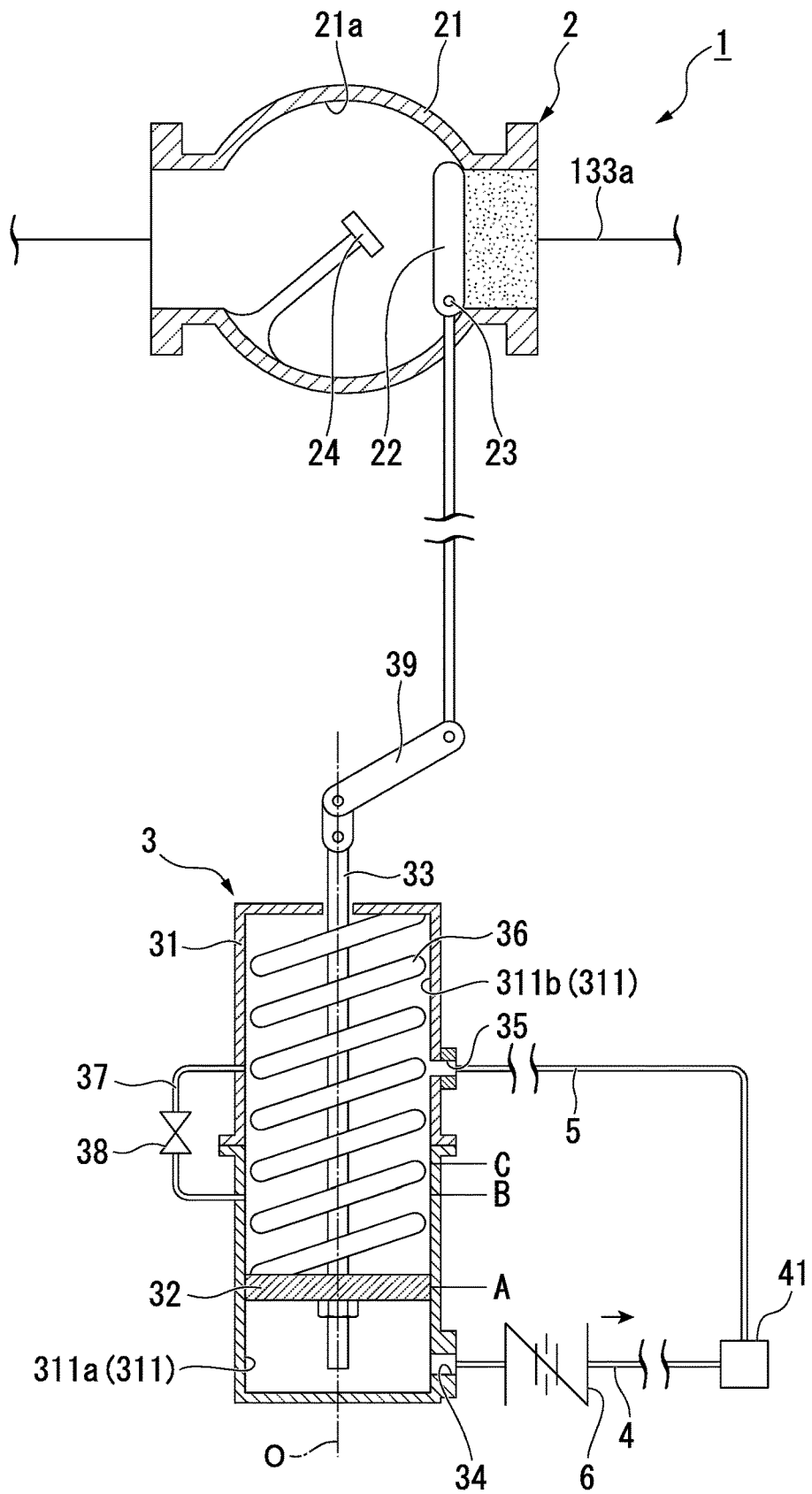
FIG. 3 is a schematic view showing the valve device when the steam turbine according to one or more embodiments of the present invention is stopped.

Moreover, in the valve system 1, when the steam turbine 100 is stopped, in order to make it impossible to extract the steam S from the turbine body 110 through the extraction line 133a, the valve device 2 is in the close state. In order to make the valve device 2 in the close state, in the drive mechanism 3, the control oil is discharged from the first chamber 311a. As shown in FIG. 3 and in accordance with one or more embodiments, the control oil in the first chamber 311a is discharged from the inflow port 34 via the control oil supply line 4. The control oil of the first chamber 311a is discharged from the inflow port 34, and thus, the piston 32 moves to the first side from the margin position C toward the fully open position B. In this case, the movement of the rod 33 is not transmitted to the support shaft 23 by the connection portion 39, and thus, the support shaft 23 is not rotated. As a result, the valve body 22 is not rotated and valve body 22 is maintained in the position at which the valve body 22 and the restriction portion 24 come into contact with each other. The piston 32 further moves to the first side beyond the fully open position B, and thus, the connection portion 39 connected to the rod 33 starts the rotation of the support shaft 23. The support shaft 23 rotates, and thus, the valve body 22 is away from the restriction portion 24 and rotates toward the opening of the valve main body 21. The piston 32 moves beyond the open and closed positions A, and thus, the valve body 22 rotates to the position at which the valve body 22 closes the opening of the valve main body 21. Accordingly, the valve device 2 is in the close state, and thus, the steam S in the turbine body 110 cannot be extracted through the extraction line 133a.

Moreover, in the valve system 1 of one or more embodiments, an operation test is periodically performed to confirm whether or not the piston 32 is correctly operated with respect to the drive mechanism 3 when the steam turbine 100 is operated.

Figure 4:
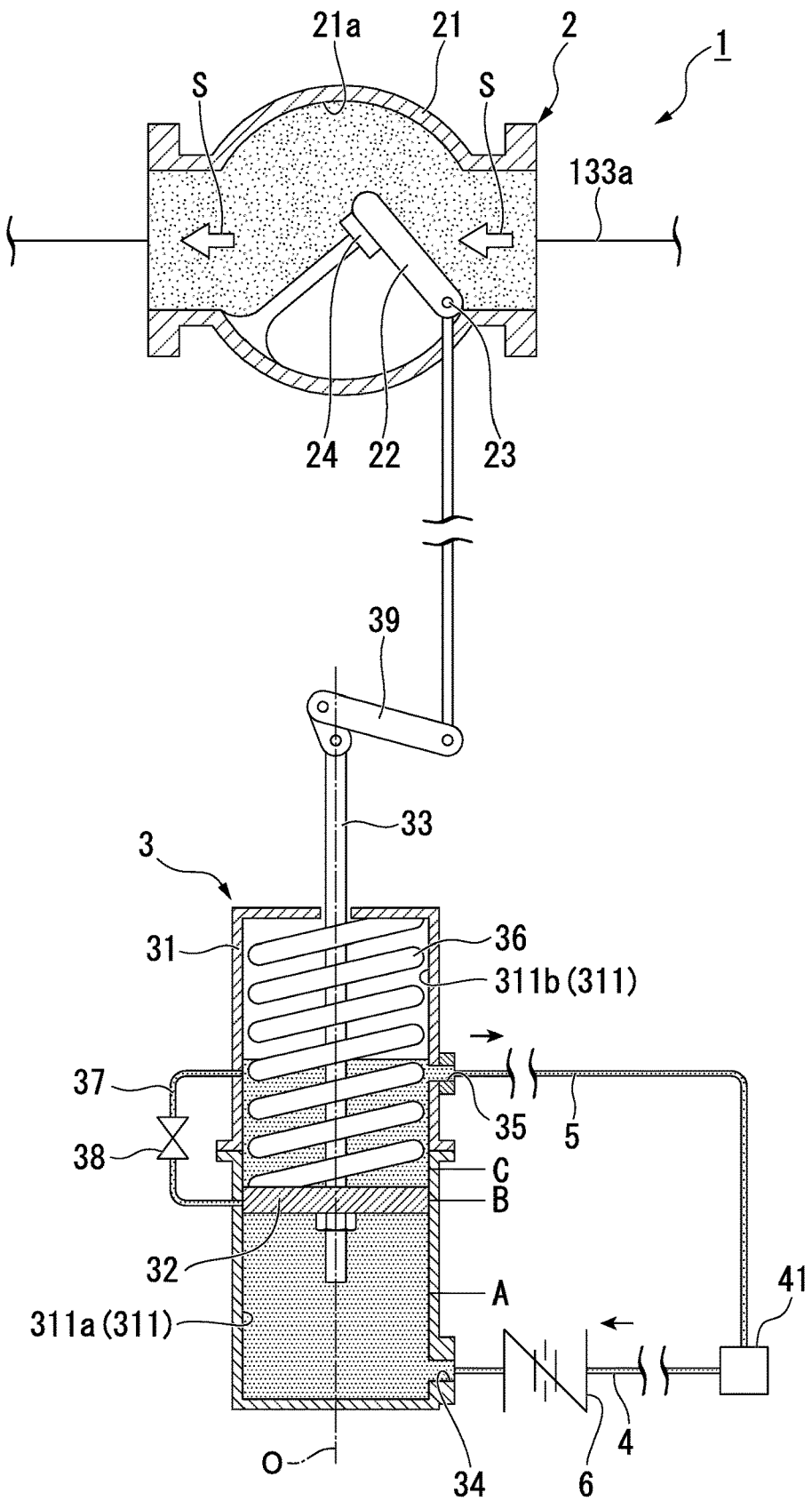
FIG. 4 is a schematic view showing the valve device when an operation test according to one or more embodiments of the present invention is performed.

When the operation test is performed, the on-off valve 38 is opened while the control oil is supplied to the first chamber 311a during the operation of the steam turbine 100. The on-off valve 38 is opened, and thus, the control oil can flow through the bypass passage 37. As a result, as shown in FIG. 4 according to one or more embodiments, the control oil in the first chamber 311a flows into the second chamber 311b via the bypass passage 37. The control oil in the first chamber 311a flows into the second chamber 311b, and thus, the piston 32 moves from the margin position C toward the first side by the amount of the control oil flowing into the second chamber 311b. Accordingly, the position of the piston 32 is moved, and thus, it is possible to determine whether or not the piston 32 is normally operated.

In this case, the bypass passage 37 is connected to the first chamber 311a at a position on the second side with respect to the open and closed positions A. Accordingly, even when the on-off valve 38 is opened in a state where the control oil is supplied from the inflow port 34 to the first chamber 311a, a liquid surface of the control oil does not move to the first side beyond the fully open position B. Accordingly, the piston 32 moves to the position at which the piston 32 is connected to the bypass passage 37. However, the piston 32 cannot move to the first side beyond the fully open position B. That is, in the valve device 2, the valve body 22 is separated from the opening and remains open. Accordingly, it is possible to move the piston 32 without making the valve device 2 in a close state. Therefore, it is possible to perform the operation test while the valve device 2 is in the open state.

In one or more embodiments, the bypass passage 37 is not positioned on only the second side with respect to the open and closed positions A and the bypass passage 37 is connected to the first chamber 311a at a position on the second side with respect to the fully open position B and at a position on the first side with respect to the margin position C. Accordingly, even when the on-off valve 38 is opened, the piston 32 cannot move from the fully open position B toward the first chamber 311a side. Even when the piston 32 moves between the margin position C and the fully open position B, the support shaft 23 is not rotated. Accordingly, even when the piston 32 moves, in the valve device 2, the state where the valve body 22 comes into contact with the restriction portion 24 is maintained. Therefore, it is possible to move the piston 32 in the state where the valve device 2 is fully open. Accordingly, it is possible to perform the operation test in a state where the valve device 2 is fully open. As a result, it is possible to perform the operation test without decreasing the amount of the steam S extracted from the turbine body 110 through the extraction line 133a.

Moreover, the discharge port 35 is connected to the second chamber 311b to communicate with the second chamber 311b, and thus, it is possible to discharge the control oil flowing into the second chamber 311b from the first chamber 311a via the bypass passage 37 by opening the on-off valve 38. Accordingly, it is possible to suppress the control oil from accumulating in the second chamber 311b. As a result, no matter how many times the on-off valve 38 is opened, the control oil in the first chamber 311a can flow into the second chamber 311b. Accordingly, it is possible to repeatedly move the piston 32 every time the on-off valve 38 is opened, and it is possible to repeatedly perform the operation test.

In addition, the check valve 6 connected to the inflow port 34 is provided in the intermediate portion of the control oil supply line 4. Accordingly, when the pressure in the first chamber 311a is changed by opening the on-off valve 38, it is possible to prevent backflow of the control oil in the first chamber 311a through the control oil supply line 4 from the inflow port 34. In addition, the flow of the control oil from the first chamber 311a toward the control oil supply source 41 is closed by the check valve 6, and thus, it is possible to inhibit the pressure change of the first chamber 311a from affecting the control oil supply source 41.

In addition, according to the steam turbine 100 of one or more embodiments, it is possible to perform the operation test of the drive mechanism 3 while making the valve device 2 is in the full open state. Therefore, it is possible to confirm whether or not the piston 32 of the drive mechanism 3 is stuck to the cylinder case 31 due to a defect such as carbonization and the piston 32 cannot move, while operating the steam turbine 100. Accordingly, when the steam turbine 100 which has been continuously operated for a long period of time is stopped, the valve device can be steadily closed so as to prevent the steam S extracted during the operation from flowing back into the turbine body 110. As a result, it is possible to steadily operate the steam turbine 100 while suppressing the occurrence of trouble when the steam turbine 100 is stopped.

Hereinbefore, embodiments of the present invention are described with reference to the drawings. However, the configurations and combinations thereof in the embodiments are merely examples, and additions, omissions, substitutions, and other modifications of configurations are possible within the scope which does not depart from the gist of the present invention. In addition, the present invention is not limited by these embodiments and is limited only by the claims.

In addition, the valve device 2 of one or more embodiments is not limited to the case where the valve device 2 is disposed in the extraction line 133a which is the flow path 21a through which the steam S from the turbine body 110 is extracted. For example, the valve device 2 may be provided in the flow path 21a connected to the steam inflow port 131 through which the steam S flows into the turbine body 110, or the valve device 2 may be provided in the flow path 21a connected to the steam discharge port 132 through which the steam S is discharged from the turbine body 110.

Moreover, in the valve system 1 of one or more embodiments, the valve body 22 can move when the piston 32 moves via the rod 33 or the connection portion 39. However, the present invention is not limited to this structure. Any structure may be adopted as long as it can move the valve body 22 according to the movement of the piston 32.

INDUSTRIAL APPLICABILITY

According to the above-described valve system 1, it is possible to perform the operation test in a state where the valve device 2 is open.

Although the disclosure has been described with respect to a limited number of embodiments, those skilled in the art, having benefit of this disclosure, will appreciate that various other embodiments may be devised without departing from the scope of the present invention. Accordingly, the scope of the invention should be limited only be the attached claims.

REFERENCE SIGNS LIST

100: steam turbine
110: turbine body
S: steam
120: rotor
121: rotor body
122: blade
130: casing
131: steam inflow port
132: steam discharge port
133: extraction port
133a: extraction line
1: valve system
2: valve device
21: valve main body
21a: flow path
22: valve body
23: support shaft
24: restriction portion
3: drive mechanism
31: cylinder case
O: axis
311: cylinder chamber
311a: first chamber
311b: second chamber
32: piston
A: open and closed positions
B: fully open position
C: margin position
33: rod
34: inflow port
35: discharge port
36: elastic member 37: bypass passage
38: on-off valve
39: connection portion
4: control oil supply line
41: control oil supply source
5: control oil discharge line
6: check valve

What is claimed is:

1. A valve system, comprising:
 a valve device comprising a flow path and a valve body that opens and closes the flow path; and
 a drive mechanism that drives the valve body,
 wherein the drive mechanism comprises:
  a cylinder case;
  a cylinder chamber that extends in an axis direction and is formed inside the cylinder case;
  a piston that divides the cylinder chamber into a first chamber on a first side in the axis direction and a second chamber on a second side in the axis direction;
  an inflow port through which working fluid flows to the inside of the first chamber;
  an elastic member disposed inside the second chamber and that pushes the piston to the first side;
  a bypass passage that connects the first chamber and the second chamber; and
  an on-off valve that opens and closes the bypass passage,
 wherein in the valve device,
  when the piston moves to the first side, the valve body closes the flow path, and
  when the piston moves to the second side, the valve body opens the flow path, and
 wherein the bypass passage connects the first chamber to a position on the second side with respect to a position of the piston in the axis direction when the valve device is in a fully open state.

2. The valve system according to claim 1,
 wherein the drive mechanism further comprises a discharge port through which the working fluid inside the second chamber is discharged.

3. The valve system according to claim 1, further comprising:
 a check valve connected to the inflow port.

4. A steam turbine, comprising:
 a valve system according to claim 1; and
 a turbine body in which steam is extracted through the flow path which is opened and closed by the valve device.

* * * * *